J. W. HIGGINS.
DEMOUNTABLE RIM.
APPLICATION FILED AUG. 5, 1919.
1,339,651.
Patented May 11, 1920
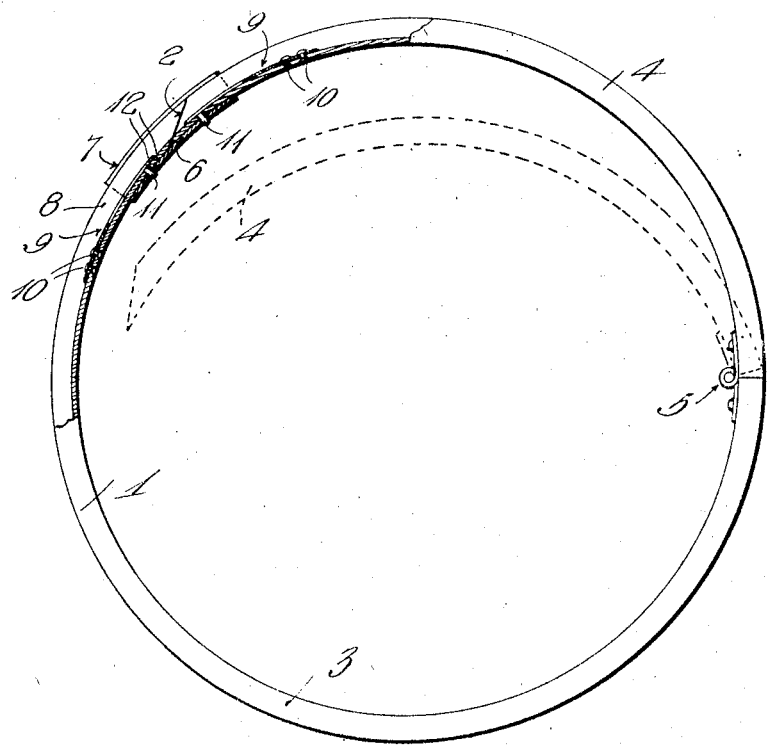
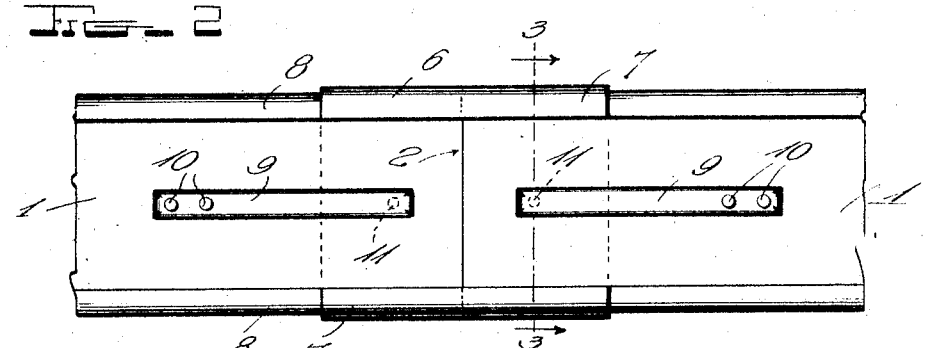
Inventor
Joseph W. Higgins

UNITED STATES PATENT OFFICE.

JOSEPH W. HIGGINS, OF BORDENTOWN, NEW JERSEY.

DEMOUNTABLE RIM.

1,339,651.  Specification of Letters Patent.  Patented May 11, 1920.

Application filed August 5, 1919. Serial No. 315,491.

*To all whom it may concern:*

Be it known that I, JOSEPH W. HIGGINS, a citizen of the United States, residing at Bordentown, in the county of Burlington and State of New Jersey, have invented certain new and useful Improvements in Demountable Rims; and I do declare the following to be a full, clear, and exact description of the invention, such as will enable others skilled in the art to which it appertains to make and use the same.

My invention relates to improvements in demountable rims, commonly used on automobiles, and has reference more particularly to rims of the type which are transversely split for easily removing and applying tires.

The object of the invention is to provide a simple and inexpensive, yet highly efficient, easily operated and in every way desirable means for connecting the meeting ends of the rim in such a manner as to hold them in accurate alinement and prevent spreading.

With the foregoing in view, the invention resides in the novel construction and arrangement of parts hereinafter described and claimed, the descriptive matter being supplemented by the accompanying drawing which forms a part of this application.

Figure 1 is a side elevation of a rim constructed in accordance with my invention, parts being broken away and in section.

Fig. 2 is a fragmentary plan view of the inner side of the rim.

Fig. 3 is a transverse section on the plane of line 3—3 of Fig. 2.

In the drawing above briefly described the numeral 1 designates an automobile rim which is split transversely at 2 and may be of one piece formation, or of relatively long and short sections 3 and 4 respectively, hinged together at 5 in such a manner as to permit the shorter section to swing inwardly as indicated in dotted lines in Fig. 1. When the two piece construction is employed, the ends of the rim may be beveled as shown to permit unobstructed inward swinging of the rim section 4. I have shown a rim of the clencher type, but obviously my improvements may be incorporated to equal advantage on rims designed for carrying straight side tires.

To normally hold the ends of the rim in alinement, I provide a slide plate 6 contacting with the inner periphery of the rim 1 and having its edges bent at 7 around the rim flanges 8, thereby holding the slide plate against removal from the rim, yet at the same time allowing it to slide freely to span the joint between the two rim ends, or to release said joint as required. When the plate 6 spans the two ends of the rim, said ends are held in strict alinement but when the plate is shifted onto either rim end, the rim may be distorted for removing or applying a tire.

In order to prevent spreading of the rim ends, I provide coacting means on said ends and the slide plate 6 for locking the former to the latter, and although such locking means could be of any preferred form, I have shown a pair of flat springs 9 secured at 10 to the outer peripheries of the rim ends and provided with locking studs 11 adapted for outward passage through registering openings 12 in the ends of the rim and the slide plate 6. The springs 9 are of very thin construction and although they would not injure the tube, even though no flap were used, such a flap is by preference employed. This flap however, is furnished with the tire casing and forms no part of my invention. The tube or flap bears against the springs 9 and it will be seen that the pressure of the tube against said springs will prevent any possible release of the locking studs 11, for instance by vibration and jarring.

Whenever the rim is to be contracted for removing a tire, the studs 11 are forced inwardly by a suitable tool and the slide plate 6 is shifted along the rim until the joint 2 is released. Contraction of the rim may then take place to insure easy removal of the tire. A reversal of this operation takes place in applying a tire to the rim and when the openings of the slide plate aline with the corresponding openings of the rim the springs 9 promptly project the locking studs 11 to operative position, thereby holding the slide plate in proper position and preventing spreading of the rim ends.

The device is of extremely simple and inexpensive nature, yet is highly efficient and in every way desirable, and since probably the best results may be obtained from the details shown and described, they are by preference followed. I wish it understood however, that within the scope of the invention as claimed, numerous minor changes may be made.

I claim:

1. The combination with a split automobile rim having side flanges; of a slide plate contacting with the inner periphery of said rim and having its edges turned around said side flanges, said slide plate being adapted to extend across the split of the rim to retain the rim ends in alinement, said rim ends and slide plate having registering openings, locking studs insertible through said openings to lock said rim ends and slide plate together, and flat springs secured to the central portions of said rim ends and carrying said studs.

2. In a device of the class described, a transversely split demountable rim, and means for preventing separation of the rim ends while and after applying the rim to the wheel, comprising a slide plate contacting with the inner periphery of the rim and having its edges curved around the rim edges to prevent detachment of said plate except by endwise sliding, and coacting fastening means on said plate and the rim ends entirely independent of the wheel felly and inaccessible for releasing when the rim is secured upon the wheel, said slide plate being movable entirely onto one rim end when said fastening means are released.

3. The combination with a split automobile rim having side flanges; of a slide plate contacting with the inner periphery of said rim and having its edges turned around said side flanges, said slide plate being adapted to extend across the split of the rim to retain the rim ends in alinement, and means for connecting said slide plate and said rim ends, including registering openings therein, a stud for passage first through the rim opening and then through the opening of said slide plate, and carrying means for said stud positioned at the outer periphery of the rim for contact with the tube of a tire, whereby pressure of the tube against said carrying means will retain the latter in position to hold said stud in said openings.

In testimony whereof i have hereunto set my hand.

JOSEPH W. HIGGINS.